United States Patent
Boivin et al.

(12)

(10) Patent No.: US 6,478,098 B2
(45) Date of Patent: Nov. 12, 2002

(54) ADJUSTABLE APPARATUS AND KIT FOR A COUPLED SNOWMOBILE SUSPENSION

(75) Inventors: Alain Boivin, St-Henry (CA); Denis Boivin, Levis (CA)

(73) Assignee: Bombardier Inc., Valcourt (CA)

( * ) Notice: Subject to any disclaimer, the term of this patent is extended or adjusted under 35 U.S.C. 154(b) by 0 days.

(21) Appl. No.: 09/969,888

(22) Filed: Oct. 4, 2001

(65) Prior Publication Data

US 2002/0060102 A1 May 23, 2002

Related U.S. Application Data

(60) Provisional application No. 60/237,489, filed on Oct. 4, 2000.

(51) Int. Cl.[7] .............................................. B62D 55/116
(52) U.S. Cl. ...................... 180/9.52; 180/190; 180/9.32
(58) Field of Search ................................. 180/182, 186, 180/190, 9, 9.1, 9.32, 9.5, 9.52, 9.54

(56) References Cited

U.S. PATENT DOCUMENTS

| 5,667,031 A | * | 9/1997 | Karpik ........................ 180/193 |
| 5,692,579 A | * | 12/1997 | Peppel et al. ................ 180/190 |
| 5,791,429 A | * | 8/1998 | Bergman .................... 180/193 |
| 5,881,834 A | * | 3/1999 | Karpik ........................ 180/193 |
| 5,944,134 A | * | 8/1999 | Peppel et al. ................ 180/193 |
| 5,947,217 A | * | 9/1999 | Snare et al. ................ 180/9.56 |
| 6,283,241 B1 | * | 9/2001 | Kubota ........................ 180/193 |
| 2002/0088652 A1 | * | 7/2002 | Zaczkowski et al. ...... 180/9.54 |

FOREIGN PATENT DOCUMENTS

| JP | 56-5276 | * | 1/1981 |
| WO | 95/17327 | * | 6/1995 |

* cited by examiner

Primary Examiner—Avraham Lerner
(74) Attorney, Agent, or Firm—Pillsbury Winthrop LLP

(57) ABSTRACT

An apparatus as an after-market, upgrade kit constructed and arranged to be installed onto an coupled snowmobile suspension system that, when installed, provides for quick and easily accessible coupling adjustment. Specifically, the upgrade kit of the present invention is configured to be installed onto the Polaris® line of snowmobiles. The upgrade kit includes a shaft having an axis of rotation, a pair of coupling blocks, and an indexer plate. The coupling blocks are adapted to be fixedly connected relative to the axis of rotation at each end of the shaft so that a torque in the shaft will be transmitted to the coupling blocks. The coupling blocks have a plurality of sides corresponding to a plurality of positions of the coupling blocks, each of the sides being located at a different distance from the axis of the shaft when the coupling blocks are connected to the shaft. The indexer plate is adapted to engage one of the coupling blocks at a selected positions of the coupling blocks. The shaft is constructed and arranged to be mounted between a longitudinal pair of slide rails of the snowmobile suspension with two bolts, and the coupling blocks are adapted to be rotated about the axis to thereby adjust the coupling of the snowmobile. A pair of support brackets are attached on the outside of the slide rails to the shaft to pass forces seen by the coupling blocks to the slide rails. Adjustment of the coupling blocks is accomplished by applying a torque to one of the bolts in a direction which tightens the bolt.

36 Claims, 16 Drawing Sheets

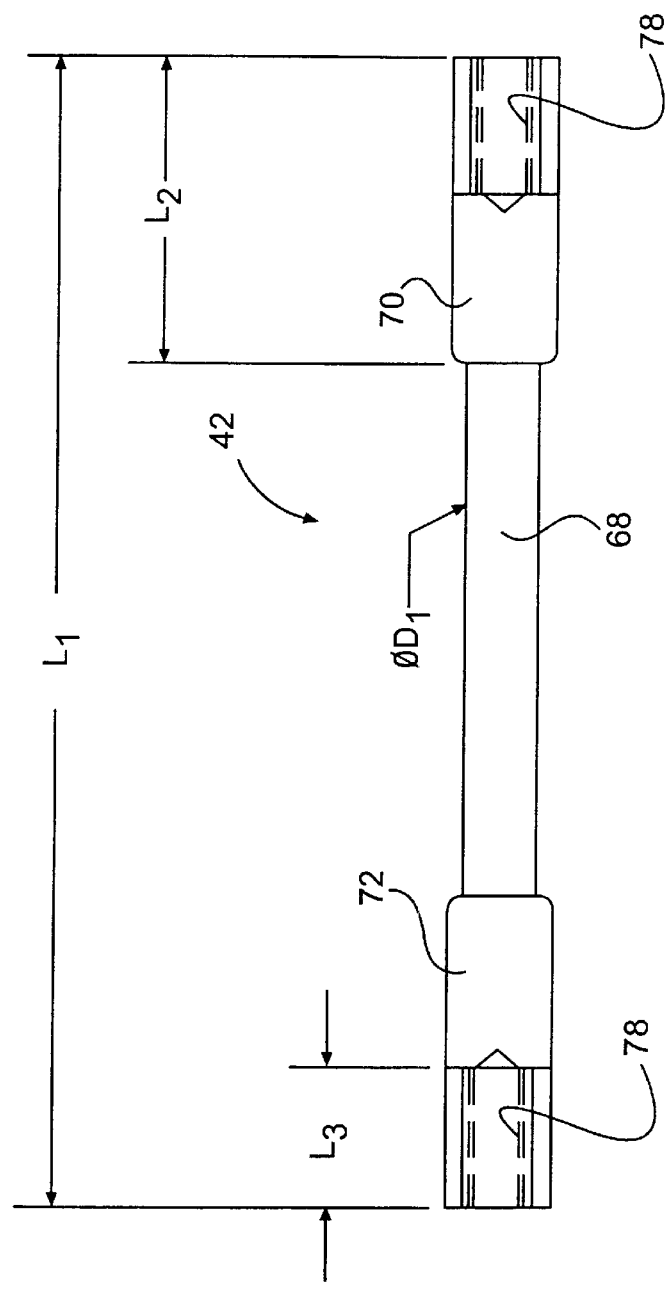

ADJUSTABLE APPARATUS AND KIT FOR A
COUPLED SNOWMOBILE SUSPENSION

This application relies for priority on U.S. Provisional Patent Application Serial No. 60/237,489, entitled "Adjustable Apparatus and Kit for a Coupled Snowmobile Suspension," filed on Oct. 4, 2000, the entirety of which is incorporated herein by reference.

FIELD OF THE INVENTION

This invention relates to snowmobile suspension systems, and more particularly to coupled suspension systems, and even more particularly to an apparatus, in the form of an after-market upgrade kit, that permits, when installed, quick and easily accessible coupling adjustment.

BACKGROUND OF THE INVENTION

Tracked vehicles such as snowmobiles have rear suspension systems generally consisting of front and rear suspension arms pivotally mounted on shafts, which are rotatably connected to the frame of the snowmobile, and a slide frame, which comprises a pair of laterally spaced apart slide rails or longitudinal skids interconnected transversely on opposing lateral sides of the machine. The slide rails are in sliding contact with an endless belt which provides ice and snow surface contact and a friction drive for the snowmobile. In many current arrangements, front and rear suspension arms pivotally interconnect the chassis to the slide frame.

It is generally known in the art that independent movement of the front and rear suspension arms is less desirable than a suspension system in which the front and rear suspension arms are coupled. In an uncoupled suspension system, when the front suspension arm deflects as it contacts a bump, the independent rear suspension arm remains in its ride or fully extended position. This results in an angle of incidence between the slide rails and the bump. Unless the impact is so large that it compresses the rear suspension arm spring and shock absorber assembly, thereby flattening the angle of incidence, the slide rails will act as a ramp forcing the rear of the snowmobile upward. That is, with the slide rails angled in an upward incline due to the independent deflection of the front suspension arm, but not the rear suspension arm, the snowmobile will hop over the bump, imparting a secondary jolt which increases in intensity with the speed of the snowmobile. This secondary jolt also results in a loss of control and a reduction of the speed of the snowmobile.

On the other hand, a coupled suspension system is one in which, for example, the rear portion of the suspension system reacts (i.e., is coupled) to the compression experienced by the front portion of the suspension system as the snowmobile passes over a bump in the terrain. In effect, the bump is "communicated" to the rear portion of the suspension, causing the rear portion to be pulled upward toward the chassis before the rear portion actually reaches the bump. This reduces the angle of incidence between the slide rail and the bump, which thereby reduces the secondary jolt experienced by the rider. As a result, a coupled suspension system provides for an improved ride because the coupled suspension is better suited to adjust to varying terrain conditions.

Manufacturers have developed a variety of ways to provide coupled suspension systems, which typically involve restricting the amount of longitudinal movement of the rear suspension arm. Such systems are shown in U.S. Pat. Nos. 5,881,834, 5,692,579, 5,667,031, and 5,944,134, which are incorporated herein by reference.

The suspension system disclosed in Polaris' U.S. Pat. No. 5,692,579 ("'579") patent is shown in FIGS. 1–4 where FIG. 1 shows the overall suspension system removed from the snowmobile, and FIGS. 2–4 show the design approach used to couple the suspension system. As disclosed in the '579 patent and depicted in FIGS. 2 and 4, the linkage of the rear suspension arm 20 with the lower pivot arm 26 permits the front of the slide rails 10 to rise substantially independently of the rear portion of slide rails. During this independent movement of the front portion of the suspension, the lower pivot arm 26 pivots from the rearward position shown in solid lines in FIG. 2 to the forward position depicted in broken lines. At the point which the front surface 27 of the lower pivot arm 26 engages the front adjuster block 30, further independent upward movement of the front end of the suspension is prevented. That is, further upward movement of the front of the slide rails 10 is mechanically linked through the adjuster block 30 to the rear suspension arm 20, causing upward movement of the rear of the suspension (the rate of upward movement of the rear of the suspension may or may not be equal to the rate of movement of the front of the suspension, depending on the specific geometric configuration of the system).

The degree of independent movement afforded to the front of the suspension rails 10 is dependent on the distance between the rear stop 32 and the front adjuster block 30 in comparison to the width of the lower pivot arm 26. The rear surface 31 of the front adjuster block 30 thus provides a limit on the relative forward movement of the lower end of the suspension arm 20 with respect to the slide rail 10.

The Polaris® system of the '579 patent further provides variability to the position of this limit, thereby giving the rider some control over the performance characteristics of the suspension. This variability is provided by using rectangular adjuster block 30, which has four surfaces that are each positioned at varying distances from the block's central mounting point, as indicated by distances "d1" through "d4" in FIG. 4. By rotating the block to select one of the surfaces, the position of the limit with respect to the lower end of the suspension arm 20 can be controlled.

However, with the above Polaris® system, it is difficult for the rider to make a desired adjustment to the adjuster block 30, especially when the rider is in the field. To make an adjustment, the rider must first loosen the central mounting point (a bolt). Then, the rider must manage to rotate adjuster block 30, either with his fingers or with the aid of another tool, to the desired location, and then retighten the central mounting point. The rider must then repeat these steps for the adjuster block on the opposite side of the slide rail. Considering that the rider may wish to make such adjustments while in the field, where he/she would encounter other obstacles, such as deep snow, cold weather, and generally unfavorable conditions for handling tools and equipment, it is apparent that making such adjustments to the adjustable block 30 in order to compensate for differing terrain conditions is difficult with the above Polaris® system.

It is therefore the object of this invention to provide an apparatus, in the form of an after-market upgrade kit, for installation onto a coupled snowmobile suspension system of the kind described in U.S. Pat. No. 5,692,579 that, when installed, allows for a quick and easy adjustment of the front to rear coupling.

It is further an object of the present invention to provide an apparatus, in the form of an after-market upgrade kit, specifically configured to be installed onto the Polaris® line of snowmobiles.

SUMMARY OF THE INVENTION

It is the object of the present invention, therefore, to provide an apparatus and an after-market upgrade kit constructed and arranged to be installed onto a coupled snowmobile suspension. The upgrade kit includes a shaft having an axis of rotation, a pair of coupling blocks, and an indexer plate. The coupling blocks are adapted to be fixedly connected relative to the axis of rotation at each end of the shaft so that a torque in the shaft will be transmitted to the coupling blocks. The coupling blocks have a plurality of sides corresponding to a plurality of positions of the coupling blocks, each of the sides being located at a different distance from the axis of the shaft when the coupling blocks are connected to the shaft. The indexer plate is adapted to engage one of the coupling blocks at a selected positions of the coupling blocks. The shaft is constructed and arranged to be mounted between a longitudinal pair of slide rails of the snowmobile suspension, and the coupling blocks are adapted to be rotated about the axis to thereby adjust the coupling of the snowmobile.

Other objects and advantages of the present invention will be realized in accordance with the following detailed description, appended drawings, and claims.

BRIEF DESCRIPTION OF THE DRAWINGS

The various embodiments of the present invention are shown throughout the drawings, in which:

FIG. 6 is a plan view of the shaft of the upgrade kit of the preferred embodiment;

FIG. 6B is a section view of the rectangular portions of the main shaft shown in FIG. 6;

DETAILED DESCRIPTION OF THE PREFERRED EMBODIMENTS

Figure 1:
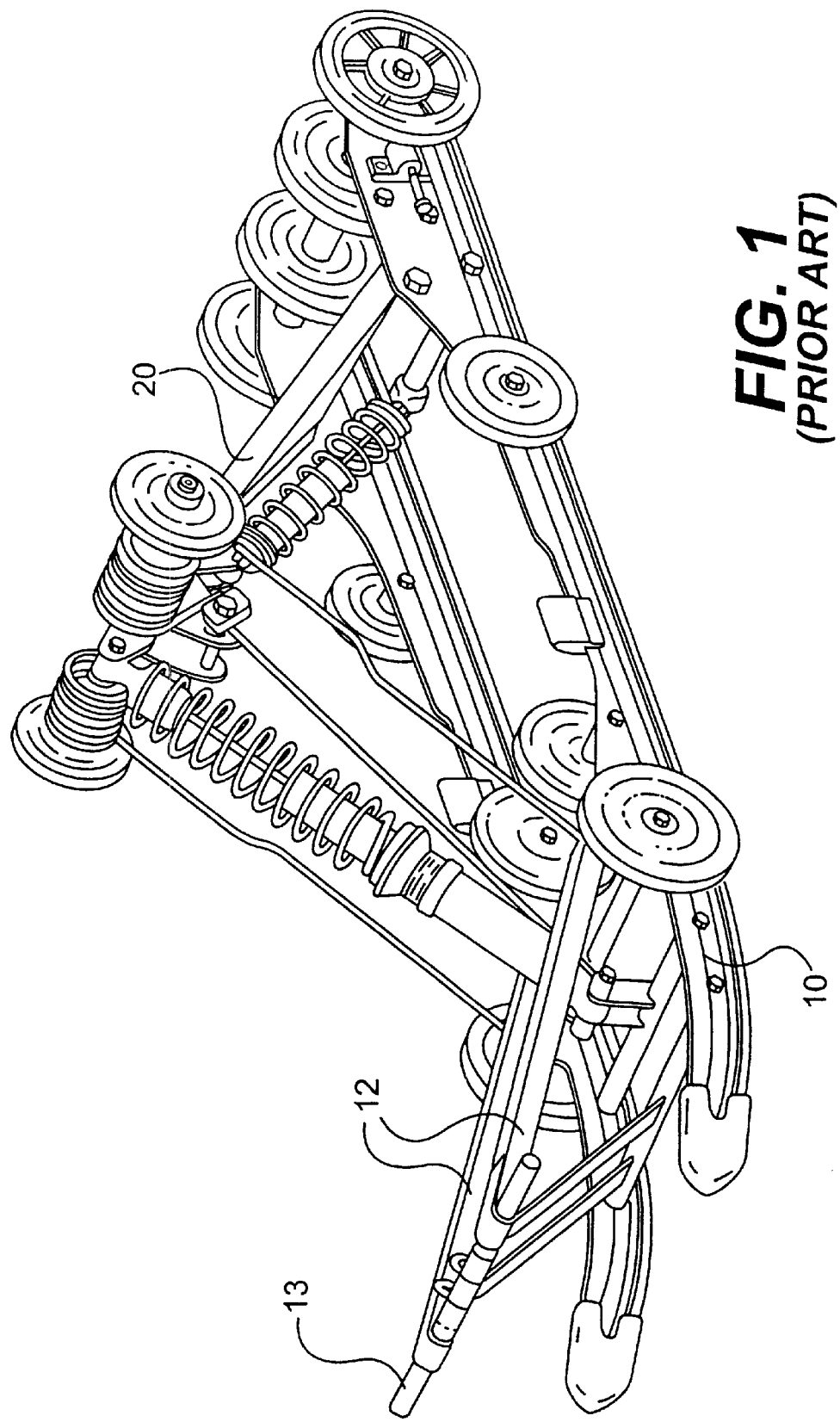
FIG. 1 is a perspective view of a coupled snowmobile suspension of the prior art.
Figure 2:
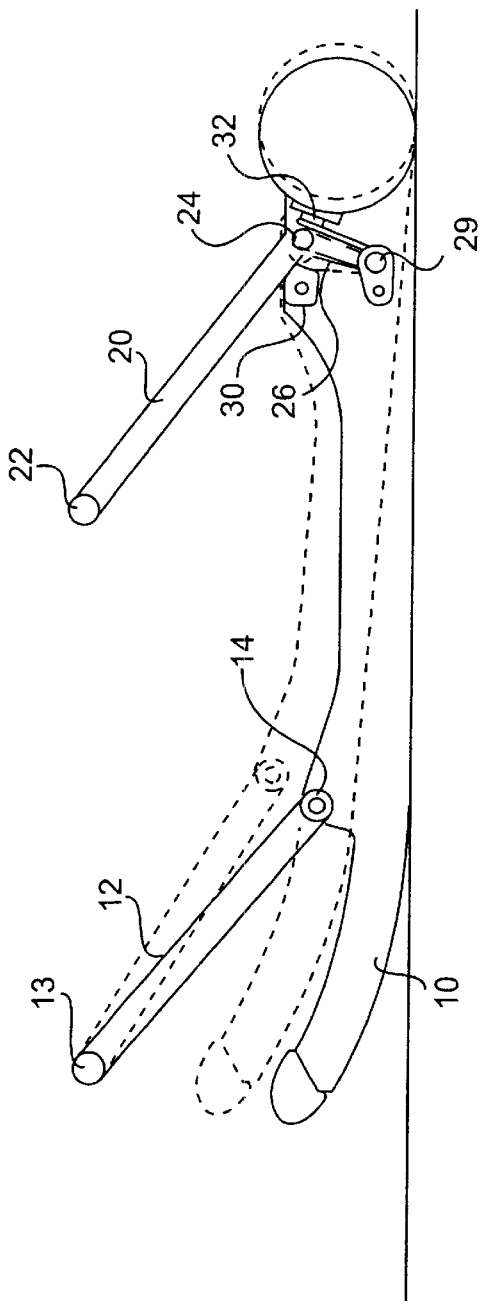
FIG. 2 is a plan view of the snowmobile suspension illustrated in FIG. 1, also showing the coupling apparatus.
Figure 4:
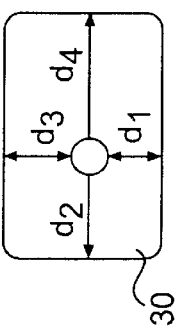
FIG. 4 is an enlarged view of the coupling block depicted in FIGS. 2 and 3, which are known in the art.
Figure 3:
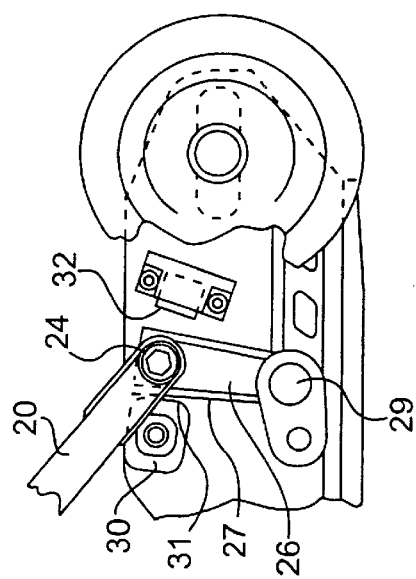
FIG. 3 is an enlarged view of a portion of the coupling apparatus shown in FIG. 2.
Figure 5:
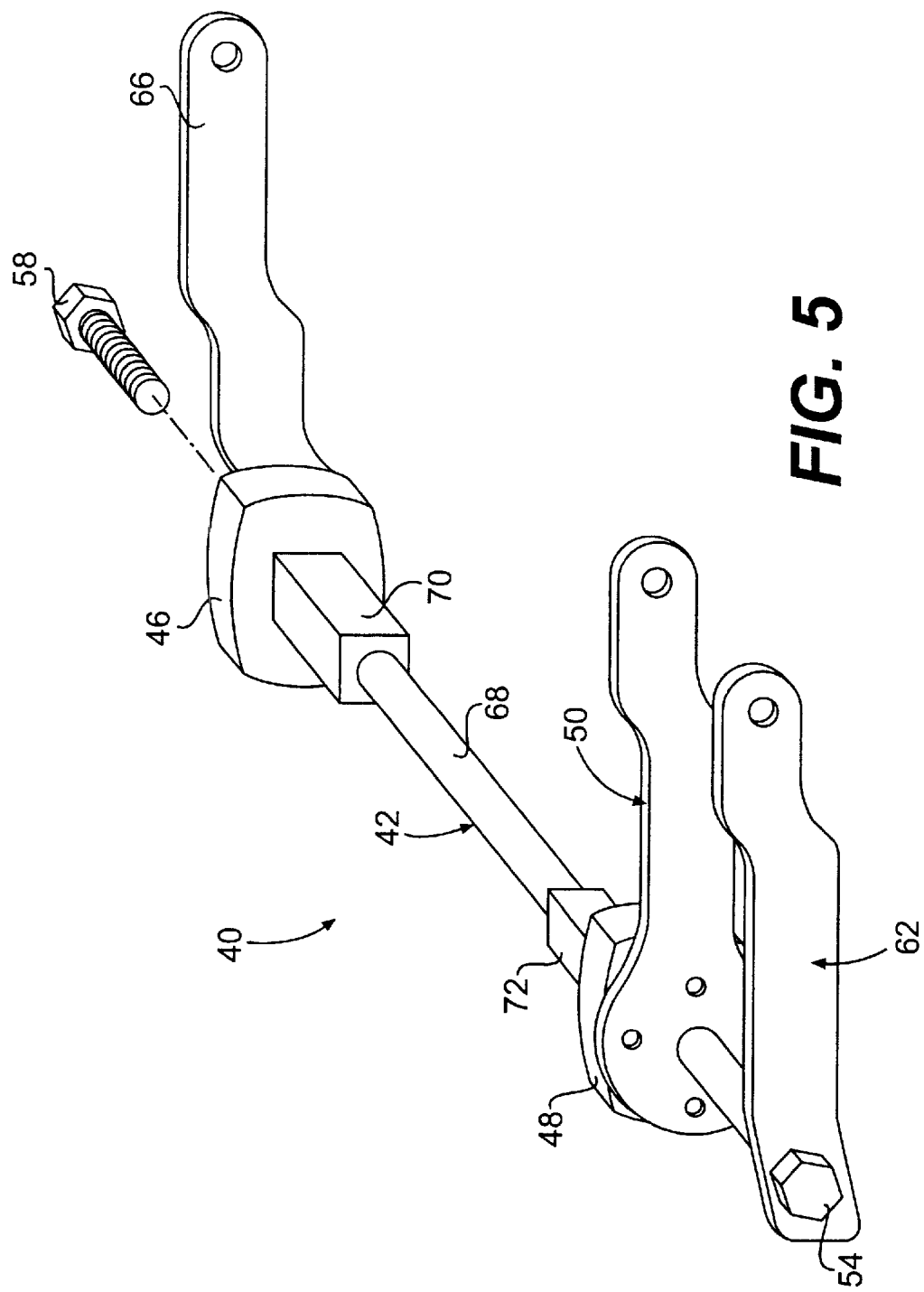
FIG. 5 is a perspective view of the preferred embodiment of the apparatus of the present invention, showing the assembly thereof before attachment to the snowmobile suspension.

Referring now more particularly to the Figures, wherein like reference numbers are used for like components where applicable, the apparatus of the present invention, which is also referred to as an upgrade kit, is generally indicated at 40 and is illustrated in FIG. 5. Generally, the upgrade kit 40 is constructed and arranged to be installed onto an adjustably-coupled snowmobile suspension system, so that, when installed, the adjustment of the coupling may be made more rapidly and easily than adjustment systems known in the prior art. More specifically, the upgrade kit 40 is configured to be assembled onto the Polaris® line of snowmobiles that are originally manufactured with adjustably-coupled suspension systems, as described above with reference to FIGS. 1–4.

Referring to the FIG. 5, the upgrade kit 40 comprises, among other components, a shaft 42, two adjustable coupling blocks 46, 48, an indexer plate 50, two bolts 54, 58, and two plate brackets 62, 66. FIG. 5 shows the upgrade kit 40 as an assembly, but not installed onto the suspension system, and FIGS. 6–15 show each component separately. The adjustable coupling blocks 46, 48 are hereinafter referred to as the coupling blocks 46, 48, and shaft 42 is also referred to as the main shaft 42.

As seen in FIGS. 5, 6, and 6B, the main shaft 42 comprises a cylindrical portion 68 and two rectangular portions 70, 72 mounted at each end of the main shaft 42. The axis of the main shaft 42 is designated as reference numeral 74 in FIG. 6B. The corners of the rectangular portions 70, 72 preferably include longitudinal chamfers 76 (see FIGS. 6 and 6B) that extend a length L3 from the end of the main shaft 42, which are configured to accommodate the coupling blocks 46, 48, described below. Each end of the main shaft 42 has a threaded bore 78 formed to a depth of length L3 therein. The threaded bores 78 accommodate the bolts 54 and 58 in order to mount the upgrade kit 40 to the snowmobile suspension.

The rectangular portions 70, 72 and cylindrical portion 68 of the main shaft are preferably integrally formed with the cylindrical portion 68 of the main shaft 42. The main shaft 42 is preferably machined from a single piece of machine stock. Of course, the main shaft 42 may be formed by other manufacturing techniques, such as by a casting. Alternatively, the rectangular portions 70, 72 may be separately formed and welded or otherwise connected to the cylindrical portion 68 to form main shaft 42. Also, the entire main shaft 42 may be rectangular, and the cylindrical portion 68 need not be present. In the preferred embodiment, the main shaft 42 is made of aluminum. However, it is contemplated that any other suitable material may be used, as long as the material selected is sufficiently strong and rigid.

Figure 7:
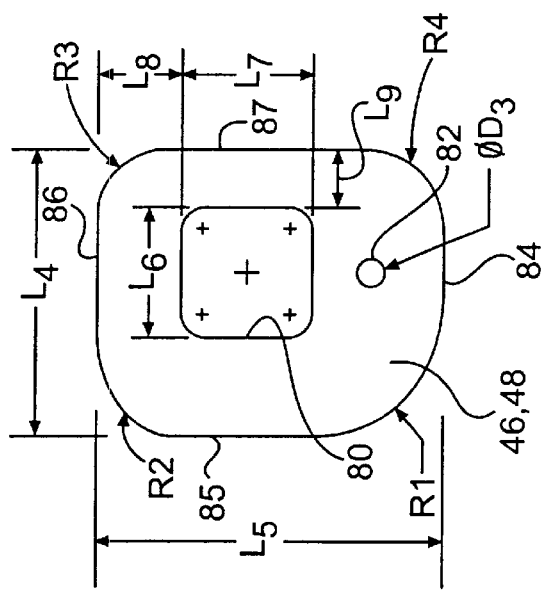
FIG. 7 is a plan view of a coupler block of the upgrade kit of the preferred embodiment.

Each coupling block 46, 48, shown separately in FIG. 7, is a generally rectangularly-shaped, rigid structure and includes a generally rectangular bore 80. The dimensions of the rectangular bore 80 are substantially the same as the dimensions of the rectangular portions 70, 72 of the main shaft 42, such that the rectangular portions 70, 72 matingly engage the bore 80. The rectangular portions 70, 72, therefore, transmit torque from the main shaft 42 to the two adjuster coupling blocks 46, 48 during rotation of the main shaft 42. The axis 74 of main shaft 42, when the main shaft 42 has been inserted into the coupling blocks 46, 48, is coincident with the centers of the rectangular bores 80. The corners of the rectangular bore 80 are, preferably, fillet radiused in a size to prevent interference with the chamfers 76 of the rectangular portions 70, 72. Also, the outside corners of each coupling block 46, 48 are preferably rounded with radii R1, R2, R3, and R4 to facilitate rotation of the blocks.

Figure 6C:
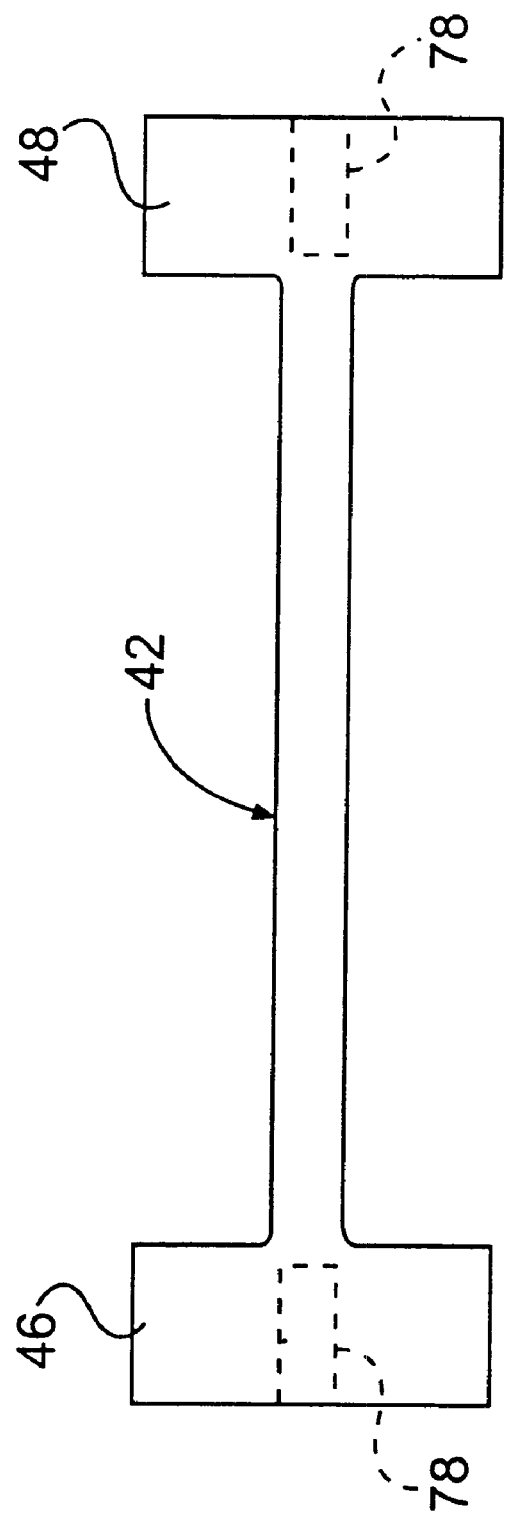
FIG. 6C is a plan view of a second embodiment of the main shaft, where the coupling blocks are integrally formed with the main shaft.

Although in the preferred embodiment, the adjuster coupling blocks 46, 48 are separate structures from the main shaft 42, it is also contemplated that the adjuster coupling blocks 46, 48 may be integrally formed with the main shaft 42 (see FIG. 6C). That is, the main shaft 42 may comprise coupler blocks 46, 48 integrally formed at each end of the main shaft. In such a case, the rectangular portions 70, 72 for transmitting torque to the coupling blocks are not required.

Figure 9:
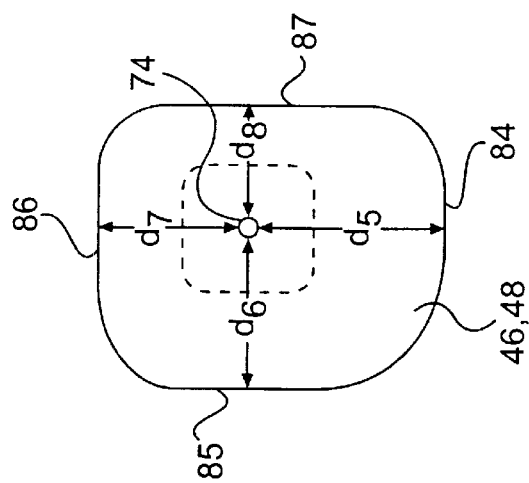
FIG. 9 is the plan view of the coupler block shown in FIG. 7, showing dimensional attributes.
Figure 8:
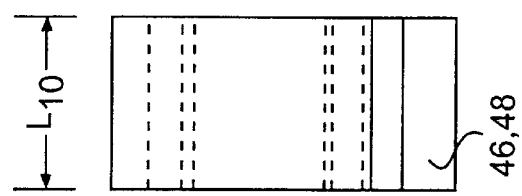
FIG. 8 is a side view of a coupler block of the upgrade kit of the preferred embodiment.

Whether integrally formed or as a separate structure, each coupler block 46, 48 in the preferred embodiment includes a plurality of sides corresponding to a plurality of positions of the coupling blocks. In the preferred embodiment, the coupling blocks 46, 48 include four sides 84, 85, 86, 87 that are each located at a different distance from the axis 74 when the coupling blocks are connected to the main shaft 42. As shown in FIG. 9 for clarity, each side 84, 85, 86, and 87 is located a distance "d5," "d6," "d7," and "d8," respectively, from the center rectangular bore 80 (or, equivalently, the axis 74 of the main shaft 42). Adjustment of the coupling system after the upgrade kit 40 is installed onto the snowmobile suspension system is accomplished by rotating the coupling blocks 46, 48 so that the desired side is selected for use (i.e., to engage surface 27 of lower pivot arm 26, shown in FIG. 3), which is discussed in detail below.

In the preferred embodiment where the coupling blocks are separate structures from the main shaft, the adjuster blocks 46, 48 preferably are made of ultra high molecular weight (UHMW) plastic, which is chosen for its light weight but high strength, rigidity, and superior wear characteristics. However, it will be understood by those skilled in the art that other suitable materials could also be used, such as a steel alloy. If the coupling blocks are integrally formed with the main shaft 42, then, of course, the coupling block material would be the same as the main shaft material.

Figure 11:
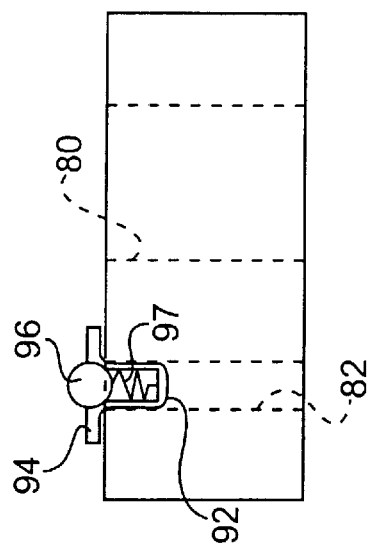
FIG. 11 is a side view of the coupling block shown in FIG. 10.
Figure 10:
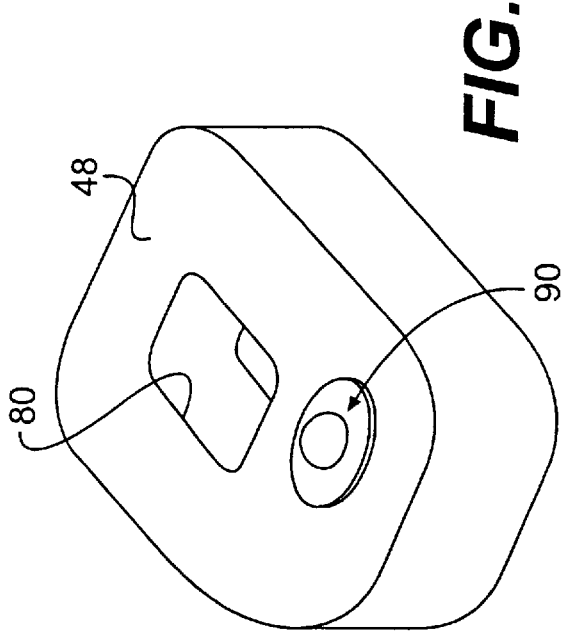
FIG. 10 is a perspective view of a coupling block having mounted thereto a ball spring plunger, which is the preferred embodiment of a protrusion of the upgrade kit.

In the preferred embodiment, at least one of the coupling blocks 46, 48 includes a cylindrical bore 82 formed therethrough, and a ball spring plunger 90 is inserted therein, as shown in FIGS. 10 and 11. The ball spring plunger 90 acts as an index stopping "pointer" or protrusion for indexing the coupling blocks 46, 48 at a selected position in conjunction with indexer plate 50, which is described below. The ball spring plunger 90 is of the conventional type, and generally includes a protrusion or ball 96 resiliently disposed, by a spring 97, against an interior edge of a flange stop 94. The spring 97 is disposed within a cylindrical chamber defined by cylindrical walls 92, the diameter of which is slightly larger than the rectangular bore 80 so that the ball spring plunger 90 interferingly fits within bore 80.

Figure 13:
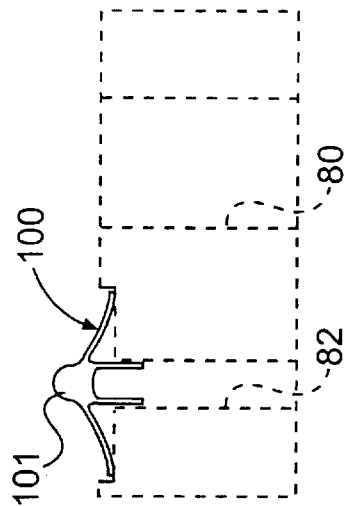
FIG. 13 is a side view of a coupling block having mounted thereto a third embodiment of a protrusion.
Figure 12:
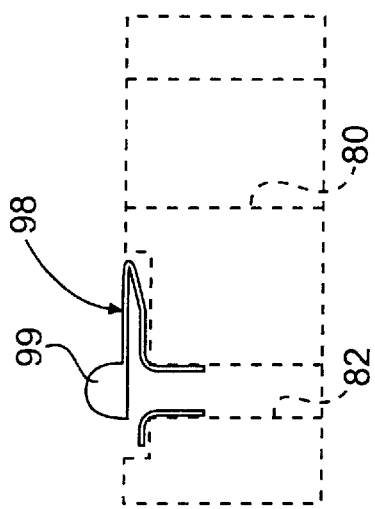
FIG. 12 is a side view of a coupling block having mounted thereto a second embodiment of a protrusion.

Although a ball spring plunger 90 is used in the preferred embodiment, it will be understood by those skilled in the art that other mechanisms can also be used to perform indexing of coupling blocks 46, 48, such as, for example, a resilient cantilever spring 98 formed with a protrusion or ball 99, shown in FIG. 12, or a bevel spring 100 formed with a protrusion or ball 101, as shown in FIG. 13.

Figure 14:
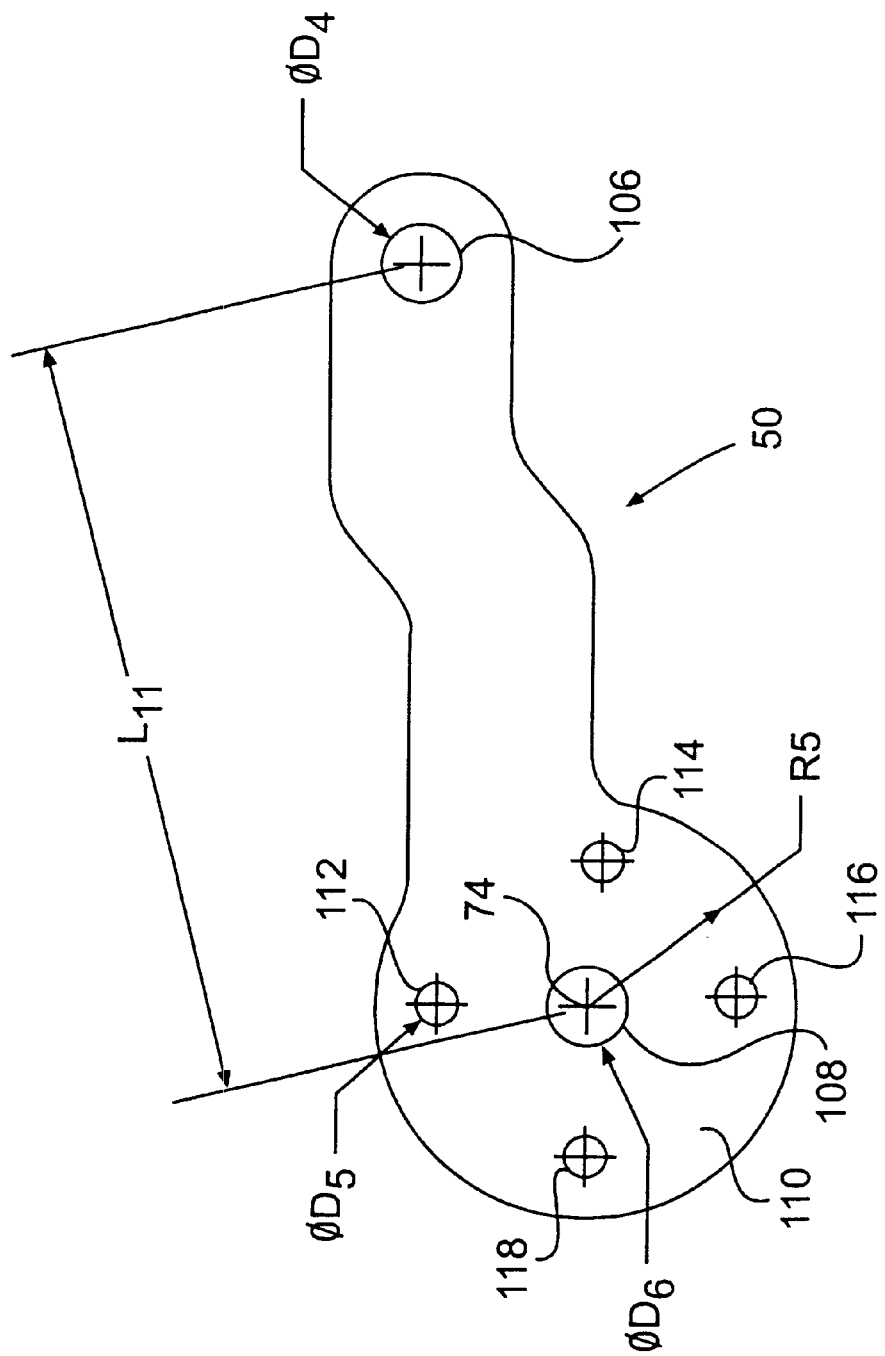
FIG. 14 is a plan view of the indexer plate of the upgrade kit of the preferred embodiment.

Indexer plate 50, shown separately in FIG. 14, has a through-hole 106 formed therethrough at one end and a through-hole 108 formed therethrough at its other end. Through-hole 108 is located approximately centrally of a generally circular portion 110 on the indexer plate 50. Four equally spaced-apart through bores 112, 114, 116, 118 are formed toward the periphery of the circular portion 110 and surround the through-hole 108. In the preferred embodiment, all of the holes are located at the same radial distance from the center of the through-hole 108. When the upgrade kit is installed onto the snowmobile, the through-hole 108 receives the bolt 54 for positioning the indexer plate 50 relative to the coupling blocks 46, 48 (the bolt 54, along with the bolt 58, also pivotally mounts the main shaft 42 to the slide rails 10), and one of the holes (i.e., either bore 112, 114, 116, or 118) is aligned with and engages the ball spring plunger 90 to establish a fixed position for the coupling blocks 46, 48. Through-holes 112, 114, 116, and 118 may also be depressions in the indexer plate with a depth sufficient to engage the protrusion or ball 96 of the ball spring plunger 90. The other end of indexer plate 50 is bolted, via the through-hole 106, to the slide rail 10 of the snowmobile to thereby fixedly define the position of the four holes 112, 114, 116, 118 with respect to the coupling blocks 46, 48. The distance between the center of the holes 106 and 108 is designated as L11. The indexer plate 50 is preferably made of brass having a thickness of 0.074 inches. However, any other suitable material with an appropriate thickness could also be used.

Figure 13B:
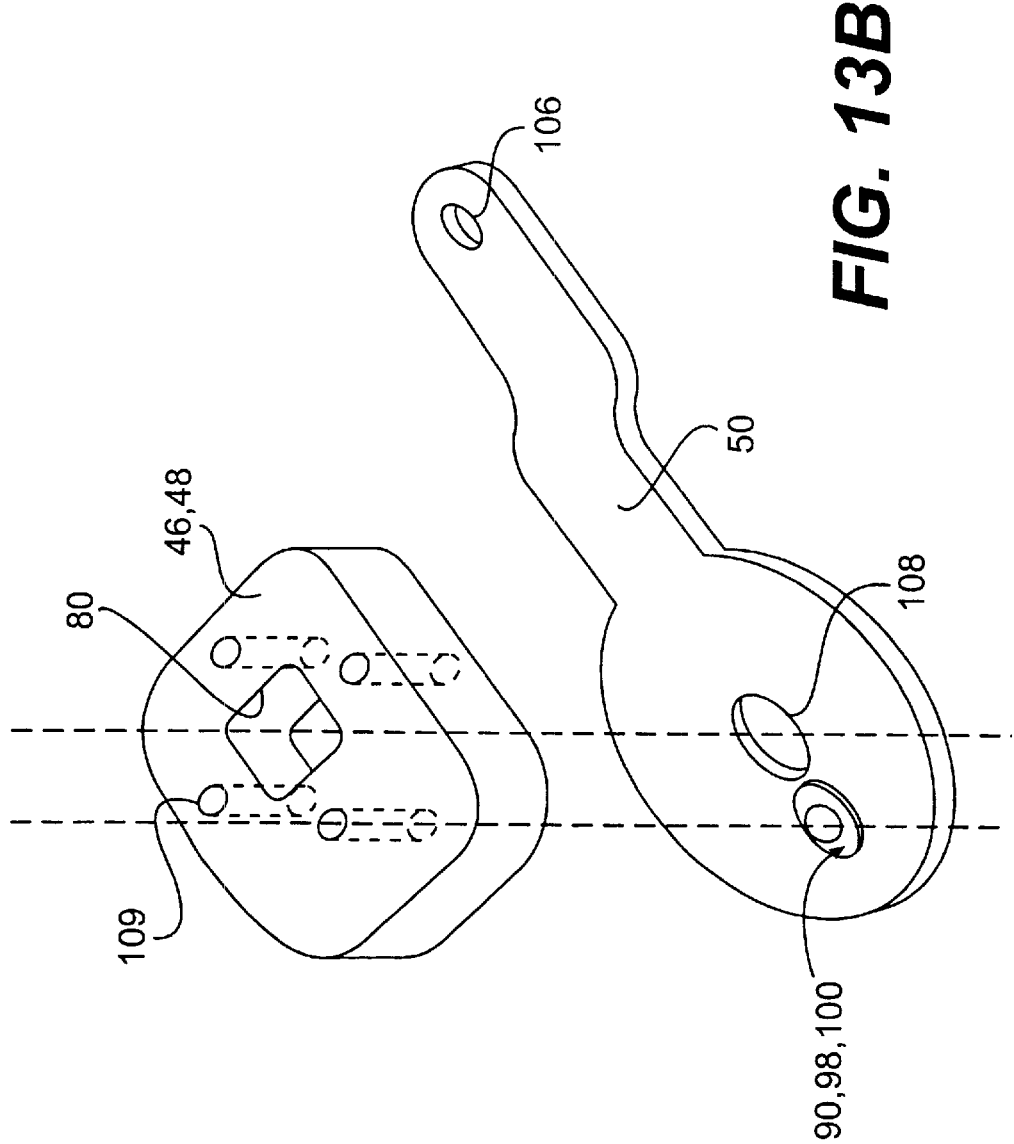
FIG. 13B is a perspective, exploded view of a second embodiment of the indexer plate and coupling blocks, where the indexer plate has mounted thereto any of the protrusions of FIGS. 11, 12, 13 and the coupling block includes a plurality of depressions.

Although in the preferred embodiment a protrusion is mounted to one of the coupling blocks for engagement with a depression (or hole) of the indexer plate, it is contemplated that the indexer plate 50, rather than the coupling blocks 46, 48, may include the protrusions. That is, as shown in FIG. 13B, the ball spring plunger 90 may be mounted to indexer plate 50 for engagement with a plurality of depressions or bores 109 formed in one of the coupling blocks (see FIG. 13B).

Figure 15:
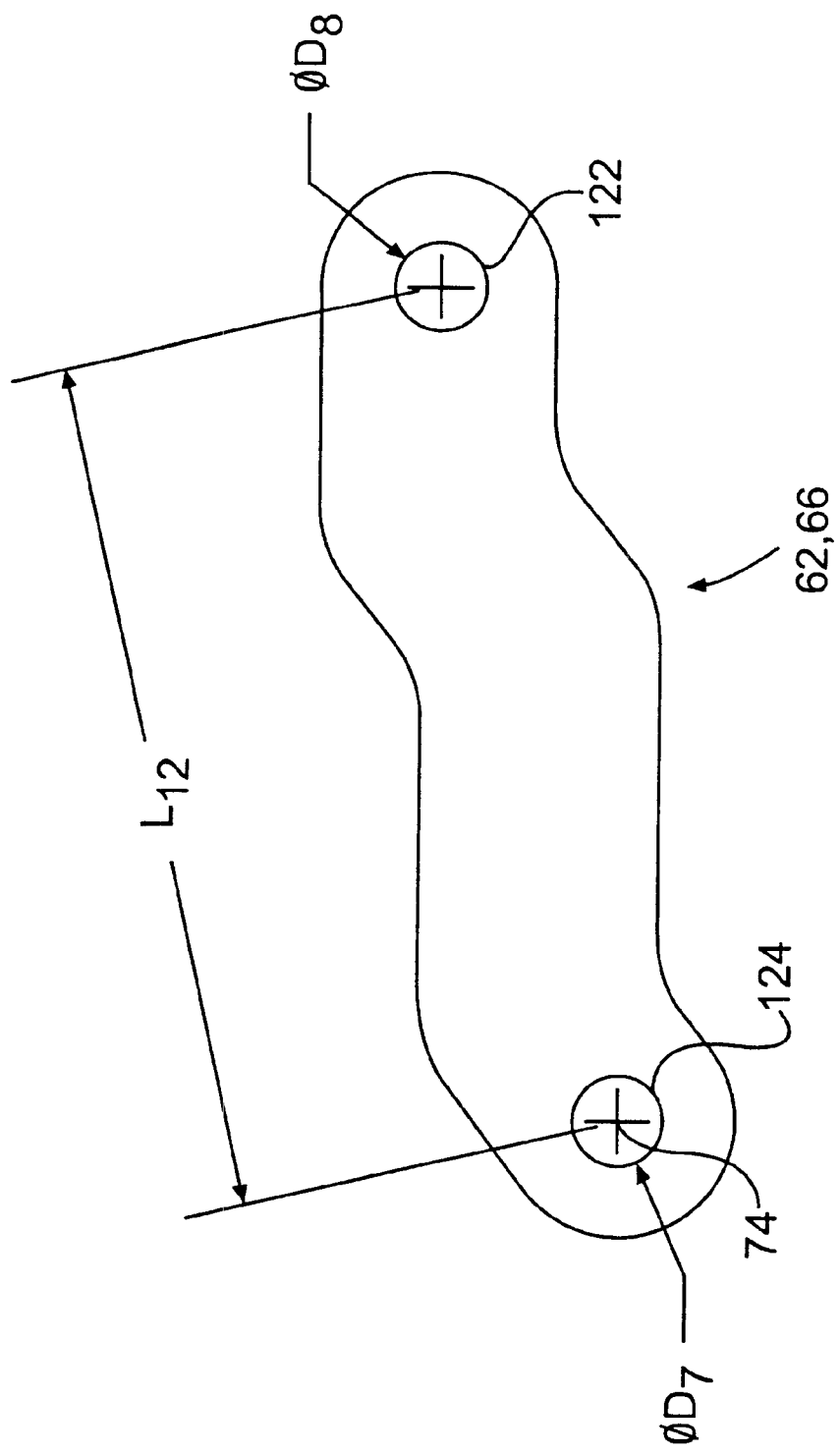
FIG. 15 is a plan view of a support plate of the upgrade kit of the preferred embodiment.

Each plate bracket 62, 66, shown separately in FIG. 15, defines two through-holes 122, 124 formed therethrough at each end. The size and proximity of the through-holes 122, 124 correspond with the through-holes 106, 108 of the indexer plate 50. Thus, the distance, L12, between the through-holes 122 and 124 is substantially the same as the distance L11. The through-hole 124 of the plate bracket 62 receives the bolt 54, which also is received by the through-hole 108 of the indexer plate 50, and the through-hole 124 of the plate bracket 66 receives the bolt 58, as shown in the assembly drawing of FIG. 5. The through-hole 122 and the through-hole 106 receives another bolt 130 (see FIG. 19), thus fixedly mounting both the plate bracket 62 and the indexer plate 50 to the slide rail 10 (discussed below). The plate bracket 66 of the opposite side of the snowmobile is likewise fixed to the slide rail 10, but without an indexer plate. The plate brackets 62, 66 provide support between the coupling blocks 46, 48 and the slide rail 10. That is, the brackets 62, 66 pass forces applied to the coupler system (when, for example, the lower arm 62 is urged against coupling blocks 46, 48) to the slide rails 10, which are made of aluminum. Because they are designed to carry stress, the plate brackets 62, 66 are preferably made from a ³⁄₁₆" brass plate. However, it will be understood to those skilled in the art that the thickness or material used is not limited solely to brass, and that other materials and/or thicknesses can be used as long as the combination selected is sufficiently strong and rigid.

Figure 16:
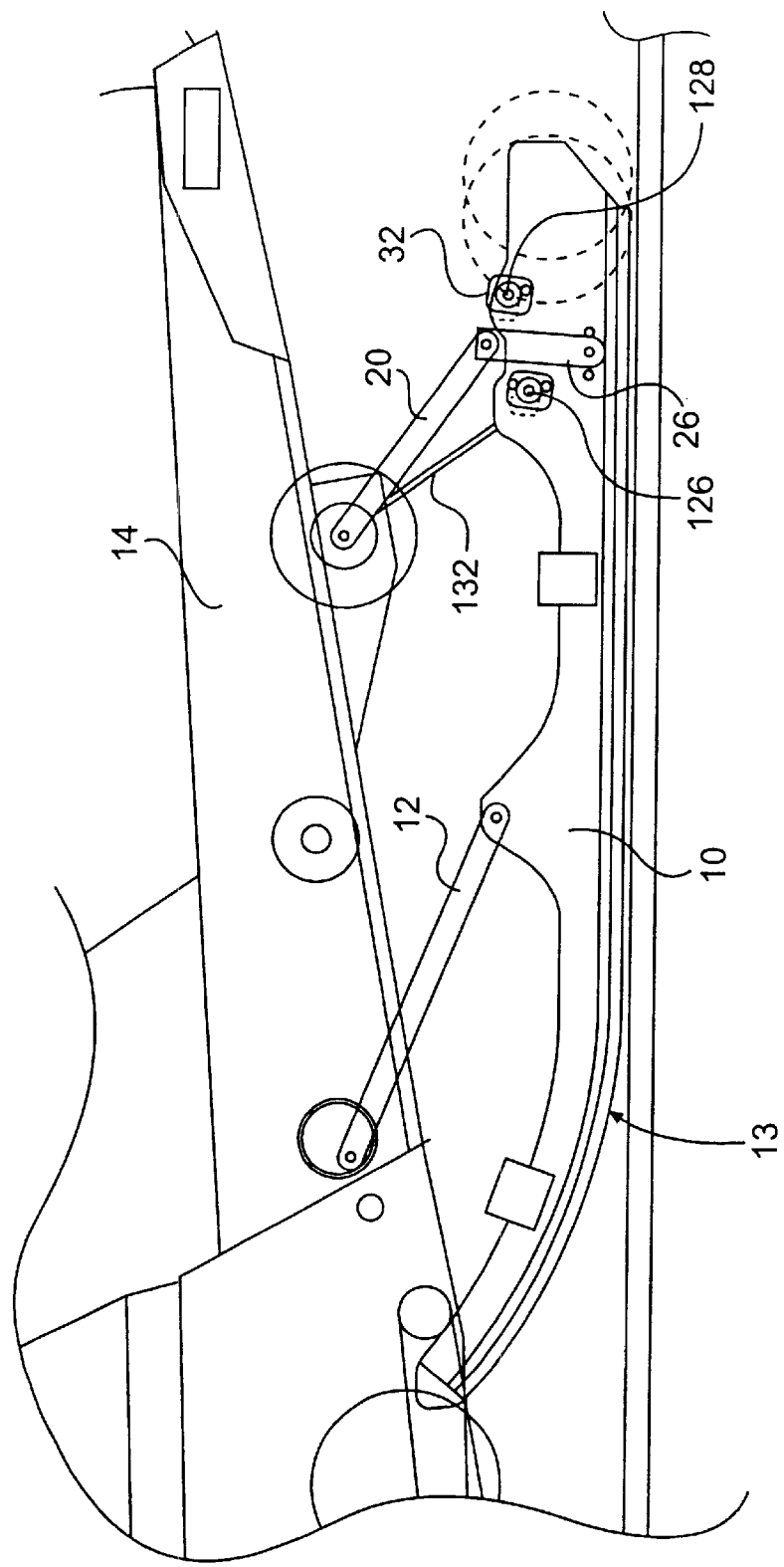
FIG. 16 is a plan view of a Polaris® XTRA-10 snowmobile suspension system without the upgrade kit installed.
Figure 17:
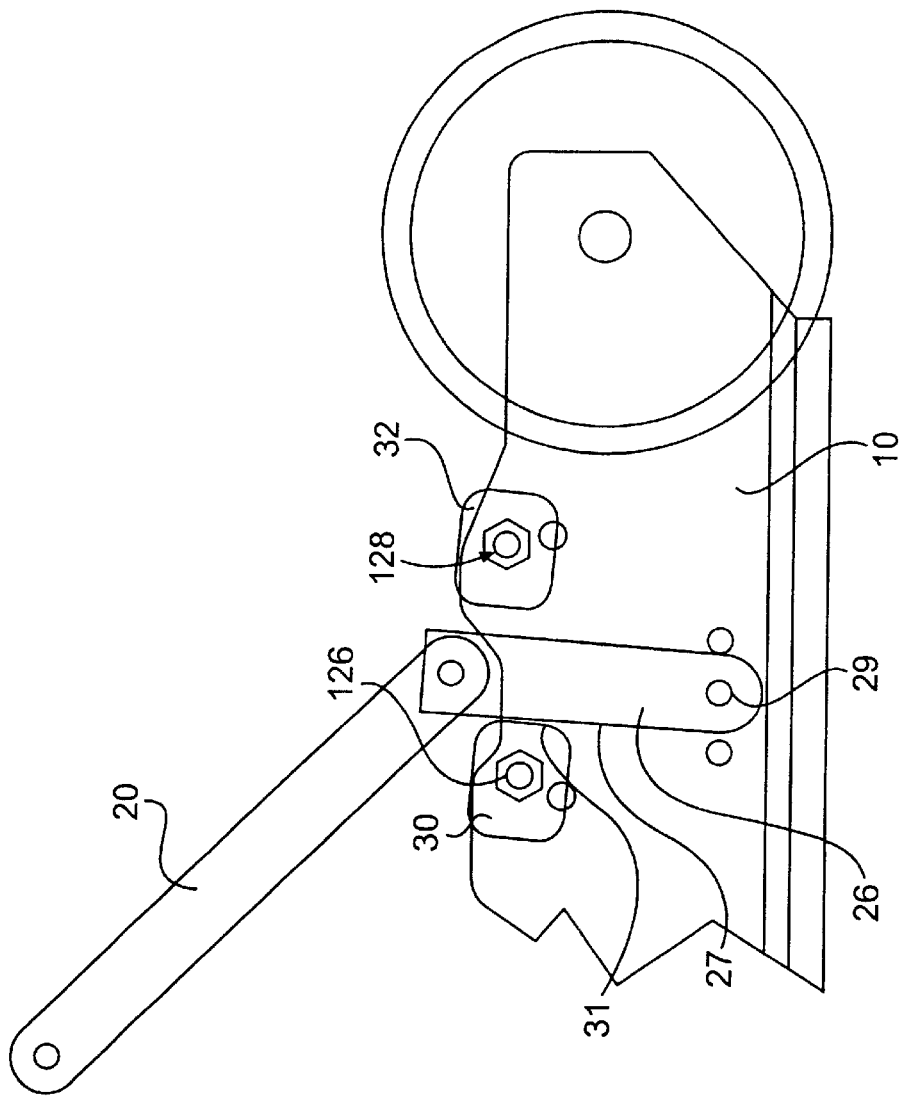
FIG. 17 is an enlarged view of the coupled portion of the snowmobile suspension illustrated in FIG. 16.

Referring now to FIGS. 16–20, the components of the upgrade kit 40 described above are constructed and arranged to be assembled and attached to the slide rails 10 of a coupled snowmobile suspension system. More specifically, the upgrade kit 40 is configured to be assembled onto a Polaris® snowmobile suspension system of the type which is generally depicted, without the upgrade kit 40 attached, in FIGS. 1–4. Even more specifically, the upgrade kit 40 is configured to be assembled onto the Polaris® XTRA-10 snowmobile suspension system, which is depicted in FIGS. 16 and 17. As seen in FIGS. 16 and 17 of the XTRA-10 model, the coupler block 30, the rear stop 32, and the lower pivot arm 26, are slightly modified from the Polaris® model shown in FIGS. 1–4. The differences, however, are not substantial, so the same reference numerals are used for equivalent elements.

Generally, the suspension system of the Polaris® snowmobile includes a slide frame 13, which comprises a pair of laterally spaced apart slide rails 10 or longitudinal skids interconnected transversely on opposing lateral sides of the machine. The slide frame 13 is interconnected to the snowmobile chassis 14 by a front and rear suspension arm, 12 and 20, respectively. As more clearly seen in FIG. 17, each coupling block 30 is mounted to the slide rails 10 with bolts 126, and each rear stop 32 is mounted to the slide rails 10 with bolts 128. As discussed above and described in the '579 patent, the lower pivot arm 26 can rotate within the limits defined by rear surface 31 of the front adjuster block 30 and rear stop 32. The remainder of the suspension system is known in the art and described in the '579 patent, and therefore need not be described in detail here.

Figure 18:
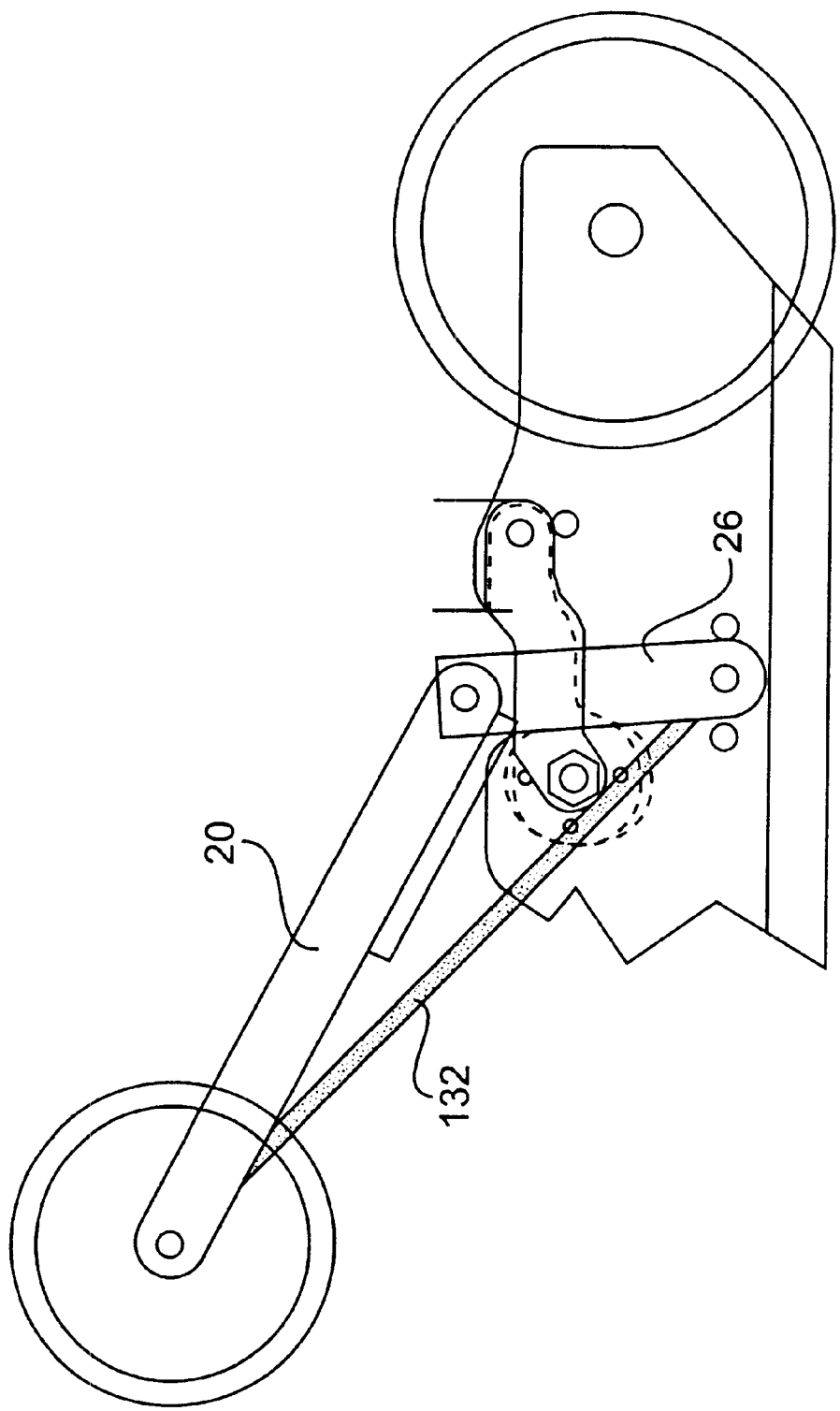
FIG. 18 is a plan view of a portion of the suspension system of FIG. 16 with the upgrade kit installed.
Figure 19:
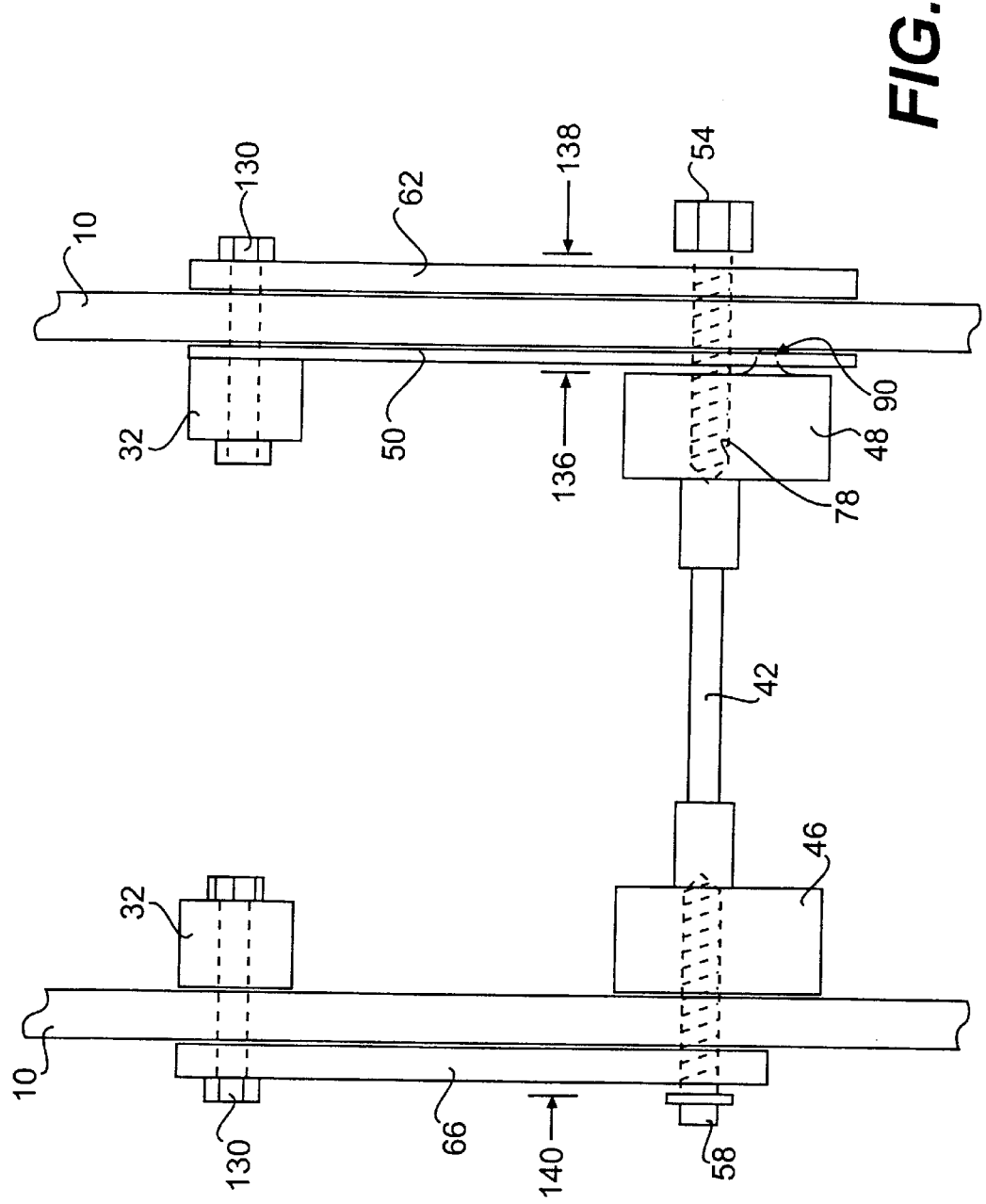
FIG. 19 is a top view of the upgrade kit installed onto the Polaris® XTRA-10 snowmobile suspension system shown in FIG. 16.

Referring now to FIGS. 18 and 19, the attachment of the upgrade kit 40 to the Polaris® suspension system will now be described. First, after raising and supporting the suspension off the ground, the bolts 126 and 128, which mount the adjuster blocks 30 and the rear stop 32 to the slide rails 10 are removed. The adjuster blocks 30 are then removed from the slide rails 10. Then, after mounting the coupling blocks 46, 48 of the upgrade kit 40 to the rectangular portions 70, 72 of main shaft 42, the assembly is installed so that coupling blocks 46, 48 replace the original blocks 30. The main shaft assembly (i.e., main shaft 42 and blocks 46, 48) is disposed on the inner side of the slide rails 10 (see FIG. 19).

The indexer plate 50 is then inserted between adjuster block 48 (i.e., the block that contains the ball spring plunger 90) and a slide rail 10 on one side of the snowmobile suspension. The through-hole 108 of the indexer plate 50 is aligned with the threaded hole 72 of the main shaft 42, and the through-hole 106 is aligned with the mounting position of the rear stop 32. The two plate brackets 62, 66 are then installed on the outside of the slide rails 10, with the through-holes 124, 122 of each plate bracket aligned with the threaded holes of the main shaft 42 and the mounting positions of each rear stop 32. The bolts 54 and 58 are then put in place, but not fully tightened, in order to retain the main shaft 42, the indexer plate 50, and the plate brackets 62, 66. The original rear stop 32 mounting bolts 128 are replaced with longer bolts 130 (preferably 1½×⅜ NC bolts with a nylon nut) and the rear stops 32 are rebolted, joining together the indexer plate 50, the slide rail 10, and the plate brackets 62, 66. The bolts 54 and 58 are then tightened for complete installation of the upgrade kit 40. Preferably, a torque of 400 in-lb is applied to the bolt 54. If a limiter strap 132 is used in the suspension system, it is disposed below the main shaft 42, as shown in FIG. 18. Also, the bolts 54 and 58 are preferably not threaded over the entire length of the bolt. Rather, the portion of the bolts extending beyond the coupling blocks 46, 48 after installation have smooth surfaces for sliding contact with the indexer plate 50, the slide rails 10, and the plate brackets 62, 66.

Figure 20:
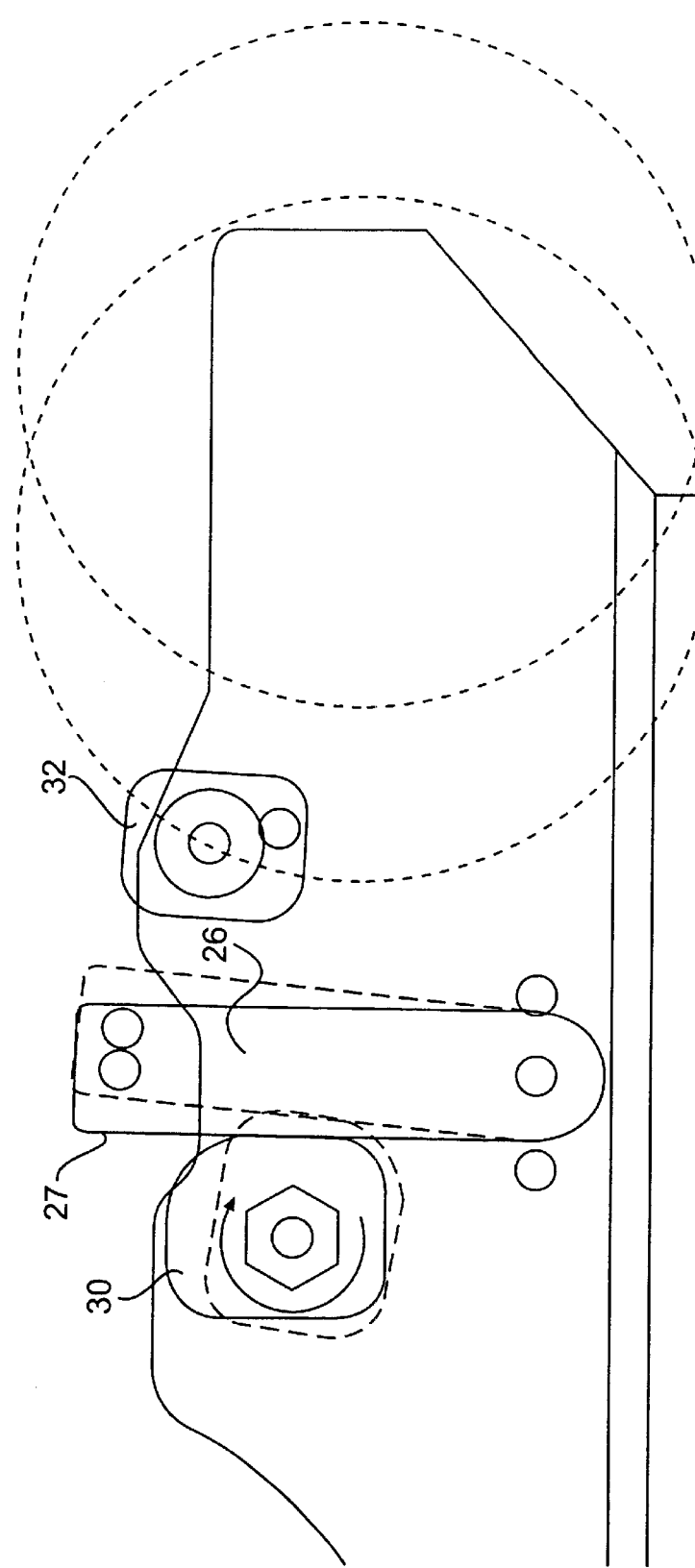
FIG. 20 is a depiction of the position of the lower arm engaged with a coupler block in two different positions of the coupler block.

A top view of the installed upgrade kit 40 is shown in FIGS. 19 and 20. As seen, when the assembly is installed and tightened, a side of the coupling blocks 48 and 46 that engages with the surface 27 of arm 26 (see solid line in FIG. 20) is initially chosen and the ball of plunger 90 corresponds with and is disposed within a hole (either bore 112, 114, 116, or 118) of the index bracket 50. After installation, once the indexer plate 50 and coupling block 48 are engaged, a small gap 136, or clearance, exists between the block 48 and the indexer plate 50, with the indexer plate 50 being disposed in contiguous relation with the ball spring plunger's 90 collar. Also, in the preferred embodiment, axial clearances 138, 140 remain between the head of bolts 54 and 58 and the support plates 62 and 66, respectively, after the bolts 54, 58 are completely tightened (i.e., bottomed-out in bores 78) to the upgrade kit 40. These clearances 138, 140 permit the coupling blocks 46, 48 to rotate easily when adjusting the coupling blocks 46, 48, discussed below.

To adjust the coupling blocks 46, 48 so that a different side engages the surface 27 of the lower pivot arm 26, a torque is applied to the bolt 54 in the clockwise direction, as shown in FIG. 20. Since this torque further tightens the bolt 54, and because the bolt 54 has already bottomed-out in the bore 78, the applied torque is transmitted to and causes the main shaft 42 and the coupling blocks 46, 48 to rotate clockwise. As torque is applied to the bolt 54, the ball 96 of plunger 90 is compressed inwardly and is forced out of the hole of the indexer plate 50. When enough rotation is effected so that ball 96 "finds" the next hole in the indexer plate 50, the ball 96 again springs into engagement with the indexer plate 50 to prevent further rotation of the adjuster blocks 46, 48. This process is repeated until the desired coupling block side (i.e., either side 84, 85, 86, or 87 (FIG. 9)) engages surface 27 of arm 26, shown as dotted lines FIG. 20.

The upgrade kit 40 of the present invention thus allows a quick and easy means to adjust the coupler of the Polaris® snowmobile. As originally manufactured, the rider had to first loosen the central mounting bolt 126. Then the rider had to, either with his fingers or with the aid of another tool, rotate block 30 to the desired location, and then retighten the central mounting bolt 126. The rider had to then repeat these steps for the adjuster block on the opposite slide rail. With the upgrade kit 40 installed, however, the rider only needs to perform a single step, which is to rotate the bolt 54 clockwise with a suitable tool until the desired sides of the coupling blocks 46, 48 are in position. Notably, no loosening of the system is required, and no further tightening is required once the desire coupling block side, for engagement with surface 27, is in position. The ball plunger's 90 engagement with the indexer plate 50 prevents further rotation of the adjuster blocks 46, 48 without the need to further tighten the bolts 54 or 58. This allows the rider the ability to quickly and easily adjust the coupling of the suspension for varying terrain conditions. Furthermore, the head of bolt 54 is preferably sized to accommodate a conventional spark-plug wrench. Thus, the rider, who typically already carries a spark-plug wrench when riding the snowmobile, need not bring an additional tool in order to make a coupling adjustment in the field.

Though not intended to be limiting, the dimensions of the components of upgrade kit 5, which are sized for the Polaris® XTRA-10 snowmobile suspension, are the following:

TABLE 1

Dimensions of Upgrade Kit 40 Components

|  | Dimension (inches) |
| --- | --- |
| Main Shaft 42 (FIG. 6) | |
| L1 | 8.468 |
| L2 | 2.250 |
| L3 | 1.000 |
| D1 | 0.500 |
| D2 | 0.900 |
| Coupling blocks 46, 48 (FIGS. 7 and 8) | |
| L4 | 1.656 |
| L5 | 1.988 |
| L6 | 0.750 |
| L7 | 0.750 |
| L8 | 0.475 |
| L9 | 0.344 |
| L10 | 1.000 |
| R1 | 0.750 |
| R2 | 0.500 |
| R3 | 0.375 |
| R4 | 0.500 |
| Indexer plate 50 (FIG. 14) | |
| L11 | 3.741 |
| D4 | 0.375 |
| D5 | 0.265 |
| D6 | 0.395 |
| R5 | 1.000 |
| Plate brackets 62, 66 (FIG. 14) | |
| L12 | 3.741 |
| D7 | 0.394 |
| D8 | 0.375 |

Although the upgrade kit 40 with the above dimensions is intended for the Polaris® XTRA-10 snowmobile, the dimensions of the components above can be modified to fit the following Polaris® models: the STORM series (model years 1996–98); the STORM SE series (year 1997); the 800 XCR series (model years 1999–2001); the XCR, XC, XCR SP, and XCR SE series (model years 1996–2000), but excluding the 440 cc XCR, XC, and XC DELUXE models; the XC SP (model years 1999–2000); the ULTRA SPX and SPX SE series (model year 1997); the INDY XLT series (model year 1997); the INDY XCF (model year 1997–99); the INDY XLT Special (model year 1998–99); the INDY 440 and 500 (model year 1996–1999); the INDY SUPER SPORT series (model year 1996–2000); the INDY TRAIL (model year 1996–99); and the INDY TRIUMPH (model year 2000). In addition, as would be understood by those skilled in the art, there are potentially other snowmobile suspensions on which the present invention may be used.

In the preferred embodiment, the upgrade kit 40 is referred to as an after-market add-on apparatus that can be purchased and installed onto the snowmobile. However, it is also contemplated that the manufacturer may install the components of the upgrade kit 40, or equivalent components, prior to the sale of the snowmobile. Therefore, the upgrade kit 40 is intended to refer to the components of the kit 40 described herein above, regardless of whether the components are installed by the manufacturer prior to sale of the snowmobile, or whether the kit 40 is installed as an after-market add-on.

Figure 21:
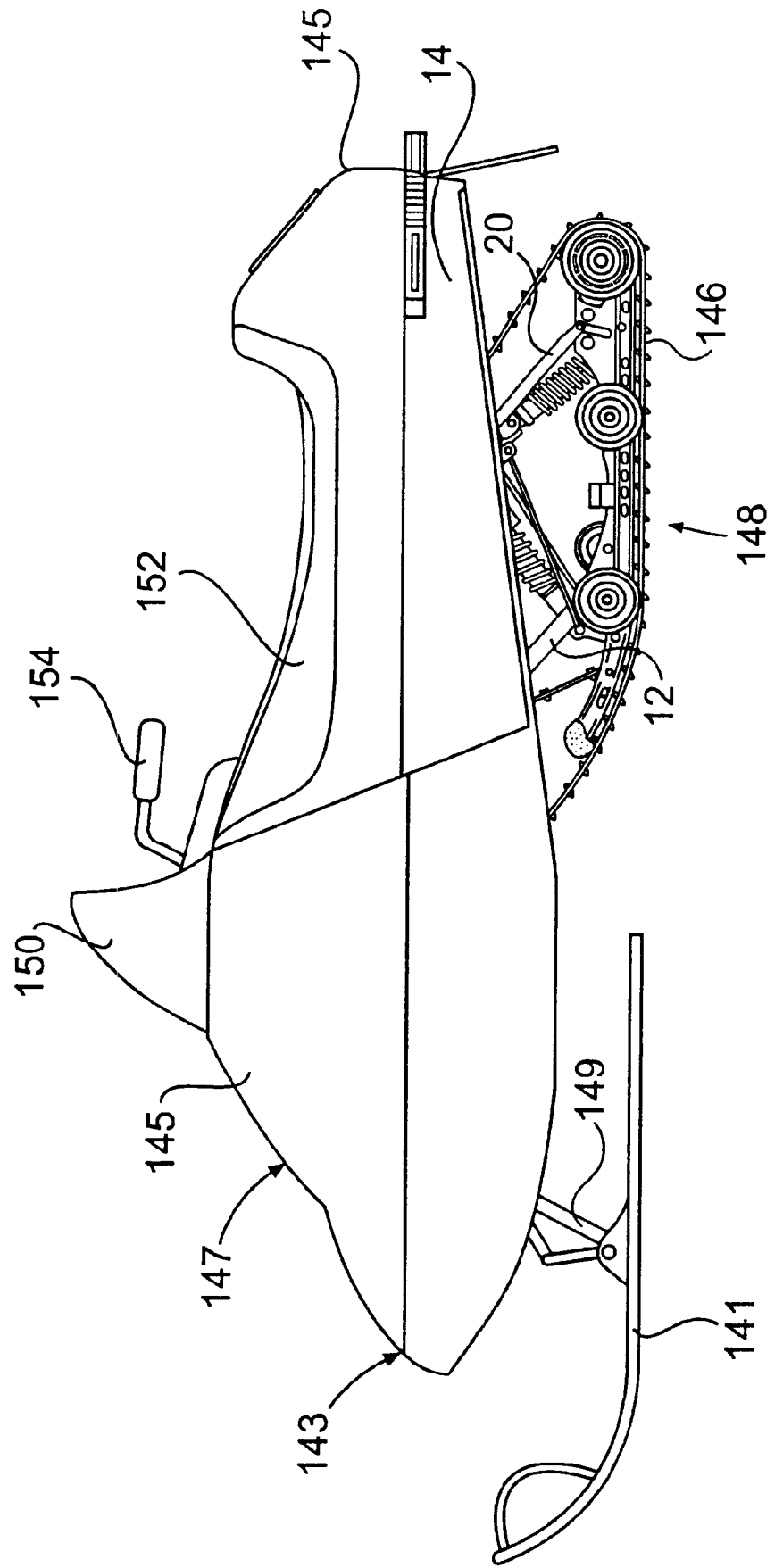
FIG. 21 is a snowmobile including the upgrade kit of the present invention.

For example, the upgrade kit 40 can be installed onto a snowmobile 140 shown in FIG. 21. The snowmobile 140, as generally known in the art, is shown having a forward end 143 and a rearward end 145 (that are defined consistently with the travel direction of the vehicle). The snowmobile 140 includes a body 147 (i.e., the exterior upper portions) and a chassis 14. While not shown in FIG. 21, an engine is carried by the chassis 14 at its forward end. In addition, two skis 141 are attached to the forward end of the chassis 14 through a front suspension 149. An endless drive track 146 of the rear suspension 148 is disposed under the chassis 14 and is connected operatively to the engine for propulsion of the vehicle.

At the front of the chassis 14, the snowmobile 140 includes fairings 145 that enclose the engine to protect it and to provide a external shell that can be decorated so that the snowmobile is aesthetically pleasing. Typically, the fairings 145 comprise a hood and a bottom pad (neither of which have been individually identified in the Figures). A windshield 150 may be connected to the fairings 145 near the forward end 143 of the snowmobile 140. The windshield 150 acts as a windscreen to lessen the force of the air on a rider when the snowmobile 10 is moving. A seat 152 extends from the rearward end 145 of the snowmobile 140 to the fairings 145. A steering device 154, such as a handlebar, is positioned forward of the rider and behind the engine. Two footrests (not shown) are positioned on either side of the seat 152 to accommodate the rider's feet.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Furthermore, the dimensions of features of various components provided are not meant to be limiting, and the size of the components can vary from the size that is portrayed in the figures and table herein in order to accommodate differently sized suspension system components.

What is claimed is:

1. An upgrade kit for a coupled snowmobile suspension, the upgrade kit comprising:

a shaft having an axis of rotation;

a pair of coupling blocks, each adapted to be fixedly connected relative to the axis of rotation at each end of said shaft so that a torque on said shaft will be transmitted to said coupling blocks, said blocks having a plurality of sides corresponding to a plurality of positions of said coupling blocks, each of said sides being located at a different distance from said axis when said coupling blocks are connected to said shaft; and an indexer plate adapted to engage one of said coupling blocks in a selected one of said positions of said coupling blocks, wherein the shaft is constructed and arranged to be mounted between a longitudinal pair of slide rails of the snowmobile suspension, wherein the coupling blocks are adapted to be rotated about said axis to thereby adjust the coupling of the snowmobile.

2. An upgrade kit according to claim 1, wherein said indexer plate includes a first through-hole at one end and a second through hole at another end.

3. An upgrade kit according to claim 2, wherein one of said coupling blocks comprises a resiliently biased protrusion for engagement with said indexer plate.

4. An upgrade kit according to claim 3, wherein said indexer plate further includes a plurality of equally spaced apart depressions for engagement with said protrusion, said first through-hole being centrally located of said plurality of depressions.

5. An upgrade kit according to claim 4, wherein said depressions are bores.

6. An upgrade kit according to claim 2, wherein said index plate comprises a resiliently biased protrusion for engagement with one of said coupling blocks.

7. An upgrade kit according to claim 6, wherein one of said coupling blocks further includes a plurality of equally spaced apart depressions for engagement with said protrusion, said axis of said shaft being centrally located of said depressions.

8. An upgrade kit according to claim 6, wherein said depressions are bores.

9. An upgrade kit according to claim 1, further comprising a pair of bolts to be inserted into through-holes formed in said slide rails for mounting said shaft at each end to said slide rails, said shaft adapted at each end to receive said bolts.

10. An upgrade kit according to claim 1, wherein said shaft and said coupling blocks are integrally formed.

11. An upgrade kit according to claim 1, wherein said plurality of sides of said coupling blocks comprises four sides.

12. An upgrade kit according to claim 1, wherein said coupling blocks are made of ultra high molecular weight plastic.

13. An upgrade kit according to claim 1, wherein said shaft is made of aluminum.

14. An upgrade kit according to claim 1, wherein said indexer plate, when installed onto the snowmobile suspension, is to be disposed between one of said coupler blocks and one of said slide rails.

15. An upgrade kit according to claim 3, wherein said protrusion comprises a resiliently biased ball mounted within a bore included by said coupling blocks.

16. An upgrade kit according to claim 9, further comprising a pair of plate brackets having one end including a through-hole therein for receiving one of said pair of bolts for attaching plate brackets to said slide rail and an other end including a through-hole therein for receiving a second bolt for attachment to said slide rails.

17. An upgrade kit according to claim 9, wherein rotation of said shaft and said coupling blocks is to be performed by applying a torque to one of said pair of bolts.

18. An upgrade kit according to claim 17, wherein said torque is applied in a direction which tightens said one of said pair of bolts.

19. A snowmobile, comprising:

a chassis;

an engine disposed on the chassis;

an endless track disposed below the chassis and connected operatively to the engine for propulsion of the snowmobile;

at least one ski disposed on the chassis;

a seat disposed on the chassis, suitable for a rider;

a steering device disposed on the chassis forward of the seat, the steering device being operatively connected to the at least one ski for steering the snowmobile;

a slide frame for engagement with the endless track, said slide frame comprising a longitudinal pair of laterally spaced apart slide rails;

a shaft having an axis of rotation;

a pair of coupling blocks, each fixedly connected relative to the axis of rotation at each end of said shaft so that a torque on said shaft will be transmitted to said coupling blocks, said blocks having a plurality of sides corresponding to a plurality of positions of said coupling blocks, each of said sides being located at a different distance from said axis when said coupling blocks are connected to said shaft; and an indexer plate adapted to engage one of said coupling blocks in a selected one of said positions of said coupling blocks, wherein the shaft is mounted between said slide rails, wherein the coupling blocks are adapted to be rotated about said axis to thereby adjust the coupling of the snowmobile.

20. A snowmobile according to claim 19, wherein said indexer plate includes a first through-hole at one end and a second through hole at another end.

21. A snowmobile according to claim 20, wherein one of said coupling blocks comprises a resiliently biased protrusion for engagement with said indexer plate.

22. A snowmobile according to claim 21, wherein said indexer plate further includes a plurality of equally spaced apart depressions for engagement with said protrusion, said first through-hole being centrally located of said plurality of depressions.

23. A snowmobile according to claim 22, wherein said depressions are bores.

24. A snowmobile according to claim 20, wherein said index plate comprises a resiliently biased protrusion for engagement with one of said coupling blocks.

25. A snowmobile according to claim 24, wherein one of said coupling blocks further includes a plurality of equally spaced apart depressions for engagement with said protrusion, said axis of said shaft being centrally located of said depressions.

26. A snowmobile according to claim 24, wherein said depressions are bores.

27. A snowmobile according to claim 19, further comprising a pair of bolts to be inserted into through-holes formed in said slide rails for mounting said shaft at each end to said slide rails, said shaft adapted at each end to receive said bolts.

28. A snowmobile according to claim 19, wherein said shaft and said coupling blocks are integrally formed.

29. A snowmobile according to claim 19, wherein said plurality of sides of said coupling blocks comprises four sides.

30. A snowmobile according to claim 19, wherein said coupling blocks are made of ultra high molecular weight plastic.

31. A snowmobile according to claim 19, wherein said shaft is made of aluminum.

32. A snowmobile according to claim 19, wherein said indexer plate, when installed onto the snowmobile suspension, is to be disposed between one of said coupler blocks and one of said slide rails.

33. A snowmobile according to claim 21, wherein said protrusion comprises a resiliently biased ball mounted within a bore included by said coupling blocks.

34. A snowmobile according to claim 27, further comprising a pair of plate brackets having one end including a through-hole therein for receiving one of said pair of bolts for attaching plate brackets to said slide rail and an other end including a through-hole therein for receiving a second bolt for attachment to said slide rails.

35. A snowmobile according to claim 27, wherein rotation of said shaft and said coupling blocks is to be performed by applying a torque to one of said pair of bolts.

36. A snowmobile according to claim 35, wherein said torque is applied in a direction which tightens said one of said pair of bolts.

* * * * *